United States Patent [19]

Ege

[11] 4,257,717
[45] Mar. 24, 1981

[54] METHOD AND APPARATUS FOR INSTALLING A POWER CABLE OR A SIMILAR ELONGATED MEMBER BETWEEN TWO BODIES

[75] Inventor: Sigmund Ege, Oslo, Norway

[73] Assignee: International Standard Electric Corporation, New York, N.Y.

[21] Appl. No.: 839,069

[22] Filed: Oct. 3, 1977

[51] Int. Cl.² .............................................. F16L 3/00
[52] U.S. Cl. .................................... 405/154; 176/69; 248/49
[58] Field of Search ............... 405/154, 158, 170, 169; 248/49, 55; 174/69, 70

[56] References Cited

U.S. PATENT DOCUMENTS

| 2,715,003 | 8/1955 | Powell | 248/55 |
| 3,219,750 | 11/1965 | Davies | 174/69 |
| 3,295,905 | 1/1967 | Sisk et al. | 174/69 X |
| 3,399,909 | 9/1968 | Ambrose | 174/69 |
| 3,546,400 | 12/1970 | Dechantsreiter | 174/69 X |
| 3,792,189 | 2/1974 | Stengel et al. | 174/69 |
| 3,870,260 | 3/1975 | Swart | 248/49 |
| 3,942,031 | 3/1976 | Bahder et al. | 248/49 X |

Primary Examiner—Dennis L. Taylor
Attorney, Agent, or Firm—John T. O'Halloran

[57] ABSTRACT

To prevent undue bending and resultant cracking of cables that span movable bodies, the cable is fastened at a plurality of points along a flexible structure connecting the bodies. A detector determines the relative movement of the bodies and provides information to a control system for positioning and directing at least two of the fastening points so that the cable will bend substantially evenly in spaces between adjacent fastening points as the bodies move.

3 Claims, 12 Drawing Figures

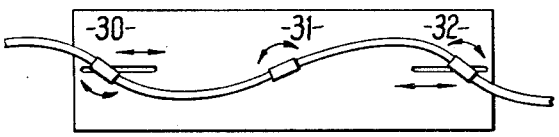
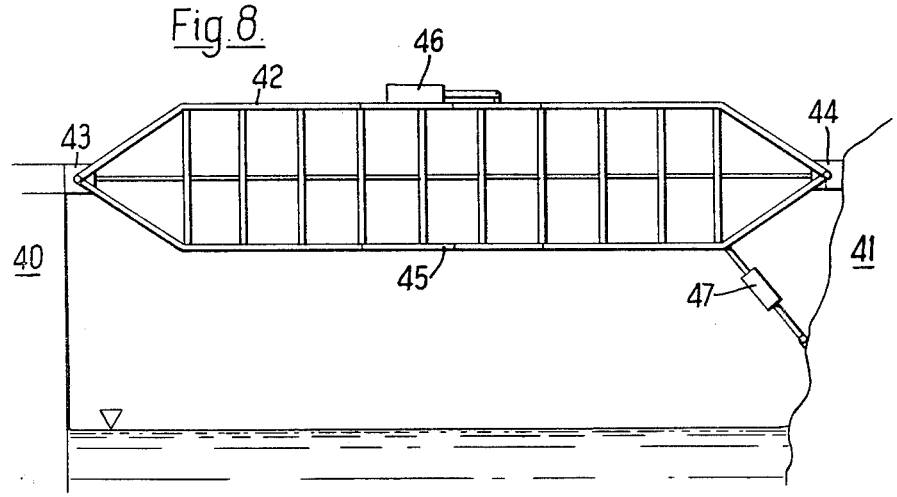
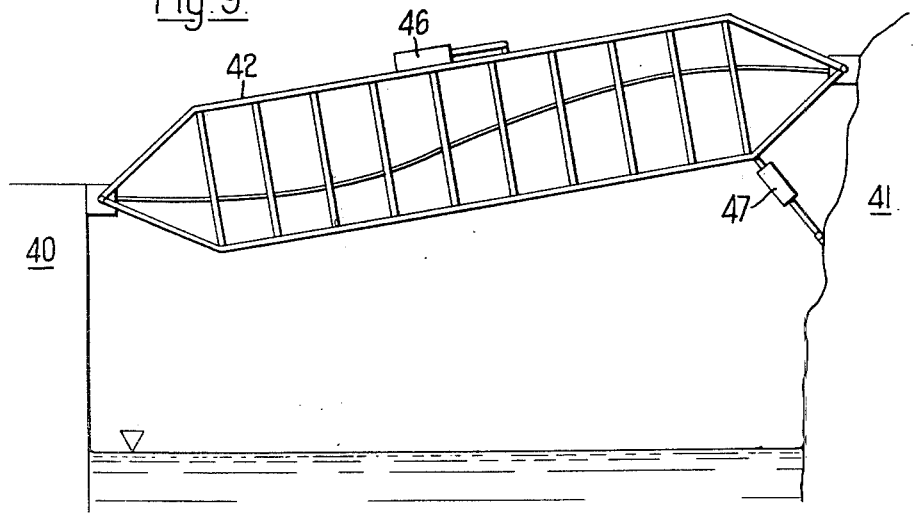

METHOD AND APPARATUS FOR INSTALLING A POWER CABLE OR A SIMILAR ELONGATED MEMBER BETWEEN TWO BODIES

This invention relates to a method and apparatus for installing a cable or a similar elongated member between two bodies. It is particularly suited when the two bodies are interconnected by a flexible structure to which the elongated member is fastened at substantially evenly distributed fastening points, the elongated member being fastened with excessive length between adjacent fastening points, thus being able to compensate for movements between the two bodies or for expansions/contractions in the structure or the elongated member (e.g. caused by temperature changes or strain variations).

It is a well known practice to install cables with some built in "snakyness" in order to allow the cable to absorb its own thermal expansion due to either a change in the ambient temperature or due to a temperature increase caused by losses in the cable during its operation. It is further common practice to control this snakyness by cleating the cable at certain intervals, for instance every half or quarter wave length if sinusoidal-shaped snakyness is imparted in the cable. It is particularly important to cleat the cable where it is placed on a sloping support, since otherwise the cable will have a tendency to creep downward for every heating cycle. A similar technique is used when a cable is crossing an expansion gap in a bridge or the like.

This arrangement will, of course, also compensate for any expansion and contraction of the bridge itself, as long as this expansion is distributed along the length on which the cable is supported.

As is also well known, however, bridges of any length have to be provided with expansion joints where the expansion of the bridge, or a portion of the expansion, may be compensated for. In the case of suspension bridges the movement in these expansion joints may be considerable, since normally only one such joint at each end of the span is used.

When a cable, a pipe, or other elongated structure pass such an expansion joint, special precautions have to be taken to distribute the movement of the bridge at the joint to a certain length of the cable or pipe on either side of the joint. Various systems have been known to work well with cables installed across expansion joints with a relatively small amount of movement, such as increasing the amplitude of the sine wave considerably at the expansion joint and attempting to distribute the movement by suspending the cable from the ends of long rods which each is allowed to swing freely like a pendulum. Other systems have employed cleats mounted on rollers.

From small dimension wire, e.g. telephone cords or the like, it is earlier known to fasten the wire(s) to an elastic cord member with built-in "snakyness". Ref. e.g. U.S. Pat. Nos. 2,143,649 and DOS 2,030,309.

As a reference to a power cable installation arranged so that movements due to thermal expansion of the cable should be distributed along the total cable length, Norwegian Pat. No. 124,340 should be mentioned.

When a power cable with lead sheath and impregnated paper insulation is considered, only very small cyclic movements may be allowed. It has been shown empirically that a cyclic bending of 0.3% will result in fatigue failures in the lead sheath after 1500 cycles. A cyclic bending of 0.1% however will endure 30,000 bending cycles. Thus it is of great importance that the local bending at any point of the cable is kept at a minimum, the value of which will depend on the cable design considered.

If high voltage cables are used which require an insulation of oil impregnated paper protected by a lead sheat, the problem of maintaining the integrity of the cable system becomes great, since repeated bending of the cable may have two effects:

The taped insulation may develop soft spots due to the fact that the paper tapes do not slide back and forth with respect to each other uniformly, at least not after a prolonged period with such bendings, and The lead sheath may crack due to these bendings.

Notwithstanding which of the known methods that has been used, the cable has always been subjected to local strain near the fastening points. And as the movements are cyclic (and repetitive, both the cable sheath and the insulation will be subjected to fatigue failures.

Common for the known methods mentioned, giving an evenly distribution of the movements, is that one relies completely on the stiffness of the cable to assure a uniform distribution of the expansion. For very long suspension bridges, however, where the expansion in the joint may be measured in meters rather than centimeters, these methods are no longer adequate. The object of this invention is to eliminate this limitation by the use of a system for ensuring controlled distribution of the cable over a sufficiently long length of the cable on either side of the expansion joint to avoid any detrimental effect on the cable. This is obtained for many similar problems by using a method or an apparatus according to one or more of the patent claims put forth below.

The invention is however, neither limited to cables nor bridges, but may be used in installing any kind of elongated members both between two bodies—where the problem is the relative movement of the bodies, and alongside a structure—where the problem is that either the structure or the elongated member expands/contracts due to variations of any outer parameters as temperature, pressure, load or the like.

In mentioning examples of various fields of application, the off-shore plants must not be omitted. Off-shore platforms often moves horizontally due to wind and current, and also move vertically due to waves and tide.

Turning again to the bridge-type problem the principle of this invention is not too different from the one mentioned above where rollers are used to facilitate the distribution of the bridge movement. The novel idea is, that the cable on either side of an expansion joint is mounted on a series of elongated supporting members which each is free to move with respect to the bridge and the movement of these structures are forceably controlled so that the gap between any two of these structures will be the same as the main expansion joint opens and closes. It will now become apparent that even large local expansions may be handled using various methods which have already proved successful for small movements, since it will only be a matter of increasing the number of these longitudinal structures until the movement between any two of them becomes small enough.

One important condition which must be fulfilled in order for this arrangement to work properly, is that the total movement in the bridge expansion joint really is distributed evenly between the elongated structures. According to one embodiment of the invention this is accomplished by a hydraulic system which employs a set of two hydraulic cylinders for each of the elongated structures, one master cylinder placed at the expansion joints and operated by the bridge itself and one slave cylinder arranged to move the elongated structure due to the pressure generated by the aforementioned master cylinder. The correct movement of each elongated structure with respect to the section of the bridge against which it is supported (on rollers) is adjusted by the use of a proper ratio between the diameters of the master and slave cylinder. For example the slave cylinder of the first elongated structure (counted from the expansion joint itself) will have a cross-sectional area of its slave cylinder only slightly larger than that of its master cylinder in order to produce almost as much movements towards the middle of the expansion joint as the bridge moves away from the middle of the same expansion joint, which in fact keeps this first elongated structure nearly stationary with respect to the ground below. This again means that it only moves slightly away from its counterpart on the other side of the middle of the expansion joint, thereby producing a gap which is small enough to be taken up by the cable using conventional methods of cable support with respect to the elongated structures. For the second elongated structure (still counted from the mid-point of the expansion joint) the slave cylinder has a cross-sectional area somewhat larger as compared to its master cylinder than was the case for the first structure and so on until the last structure has a very large ratio between cross-section area of slave cylinder to that of master cylinder, which in effect makes this elongated structure move very little with respect to the bridge itself, so that the cable may be cleated to the bridge itself outside this section without undue expansion movement in the cable occuring at the transition point.

The above embodiment of the invention has been explained in detail since it is a good example of how the desired movement of each elongated section may be controlled with good accuracy. However, this should not be taken as a limitation of the invention to this system. In fact any mechanical, electrical or other type of system may be used as well, according to this invention.

The following detailed description of one embodiment, together with reference to the attached drawings, will further explain the invention.

As will be apparent from the preceeding, the invention is particularly useful in solving the problem of cable movement at the point where the bridge (or other elongated structure supporting the cable) has an expansion joint, but it is equally suitable in limiting the amount of bending a cable is subjected to, in any other installation where cable movement is a problem. As examples of this type of installations, for which the invention would be very suitable, the following may be mentioned (keeping in mind that the use of the invention is by no means limited to only these examples):

Floating power stations (nuclear or conventional) moored inside breakwaters in such a manner that the horizontal movement is small, but not negligible, and where the barge on which the power station is located, moves up and down with the tide.

Power stations installed on floating platforms located off-shore and utilizing gas or oil from nearby oil wells to produce electric power to be transmitted to shore.

Floating power stations utilizing the difference in the temperature of the sea water.

Of these three examples the first one will have most similarity with a bridge in that it is assumed that a "bridge" structure will in fact be used to support the cable between the floating barge and the break-water. Disregarding any horizontal movement of the barge for the moment, it will be apparent that this structure will have to have an expansion joint, for instance in the middle, to allow for the variation in length as the barge moves up and down with the tide. Obviously the structure will be shortest when the two ends are at the same level, while it will be longer when the barge end moves higher or lower. As far as this longitudinal variation is concerned, there is no difference between this invention and that for a cable installed on a bridge. In addition comes however, the fact that the bridge structure in this case will have to be hinged at either end. This introduces another problem, namely that of limiting the bending of the cable also at these two points. According to a further embodiment of this invention this is accomplished by an similar arrangement in the vertical plane as the one already described for the bridge application. While the cable in the horizontal (or near horizontal) plane is arranged in a number of sine waves—starting "at the top" of one sine wave and also ending "at the top" to avoid a sharp bending at the point where the cable leaves the barge and enters the breakwater it is arranged in the vertical plane in half a sine wave; which will start at the top near the barge during high tide, and stop at the bottom of the sine wave by the breakwater, while the situation will be reversed at low tide. This "half sine wave" may be assured at all times using a system similar to the one that is described above, namely a hydraulic system with master and slave cylinders, with the cylinder diameters adjusted so as to obtain the desired movement of each support point for the cable (in the vertical plane).

In this case a mechanical system using levers of different arm lengths or an electric system whereby each support is lowered or raised by a motor obtaining its signal from a computer which assures that the proper curve is maintained at all times, may also be used.

To obtain the necessary power to actuate the master cylinders in the first case, or to obtain the input signal in the latter, it may be necessary to construct a separate structure parallel to the "cable bridge" which, in contrast to the latter, is fixed at one point, for instance on the barge, and overhangs the break-water in such a way that the master cylinders may be mounted on the end of the structure while the piston rods are connected to the breakwater. It would be practical to use rather long piston rods in order to allow for horizontal movement of the barge. In the case of a computerized system, the sensing may be done either by use of a structure as described above, or by other means, for instance optical ones.

In the second and third example it is assumed that the cable will hang, for some distance, in a catenary, which will take care of the longitudinal adjustment. In these two cases the main use of the invention will therefore be to minimize bending, both at the platform and at the other point of support, whether this is the ocean bed or some auxiliary structure. While the invention covers any shape into which the cable is formed, it would be logical to expect that in these two cases the cable will be allowed to bend into part of a circle, the radius of which is determined as the smallest radius which will not cause any damage to the insulation of the cable, its sheath or other members. The degree of bending which may be allowed, will determine the length of the structure out from the platform and up from the ocean bed. It is the object of the invention not to limit any bending to the end or near the end parts of the structure, but to assure that the cable always enters the end of the structure in such a way that, at this point, there will be no bending, and that the bending is evenly distributed over the whole supporting structure, just as in the case of the floating barge example. For this purpose the structure is equipped with an extension riding on the cable, and long enough to give a positive signal to a sensing unit mounted at the end of the structure, which in turn detects any deviation from the ideal positioning of the cable and then causes the necessary corrective action to take place.

To give a still clearer and more unambiguous understanding of this invention, reference is made to the detailed description of some examples of embodiments given below, and to the accompanying drawings, in which:

FIG. 7 shows a wagon comprising more than one cleat.

Figure 10:
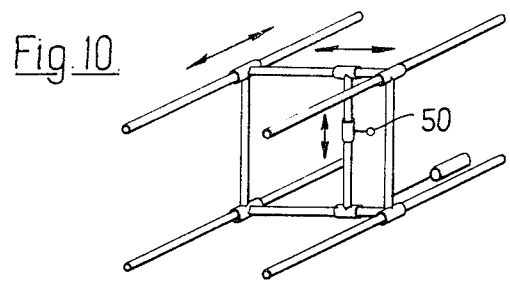

FIGS. 8, 9, and 10 show an embodiment where the controlled movements take place in more than one plane.

Figure 11:
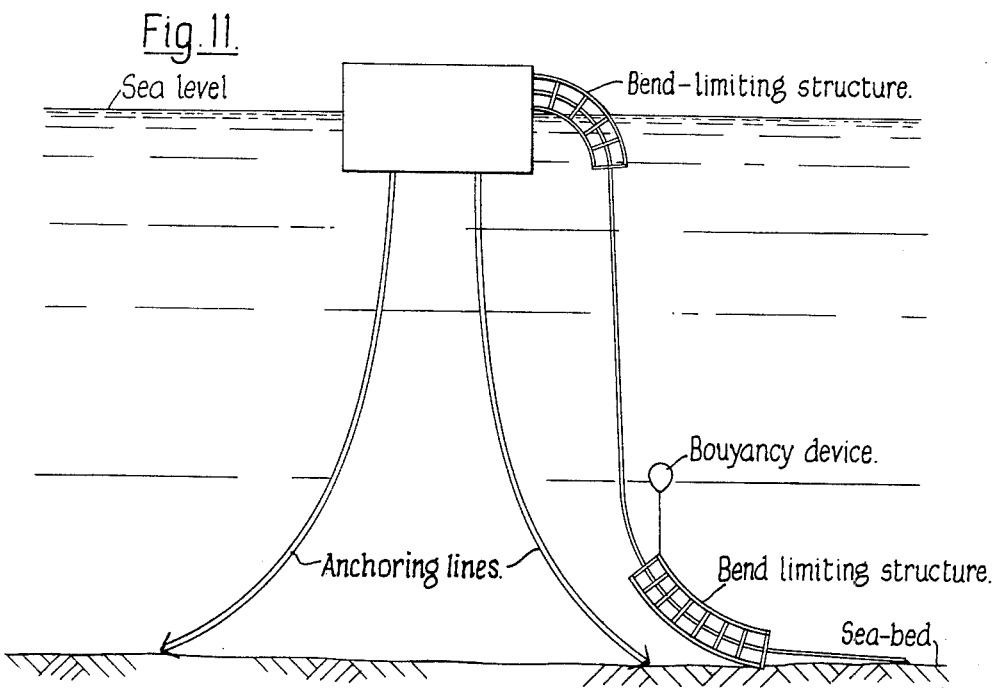

FIG. 11 shows an embodiment wherein a cable is provided with a quarter-circle form where the cable leaves the platform and where the cable enters the sea bed.

Figure 12:
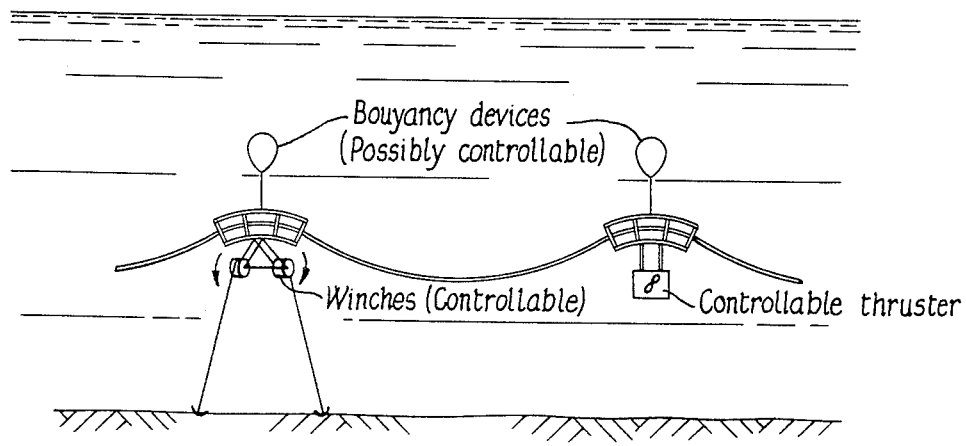

FIG. 12 shows an embodiment wherein a cable is provided with short curved bend-limiting devices which are kept in place by means of anchored buoyancy devices equipped with thrusters.

Figure 1:
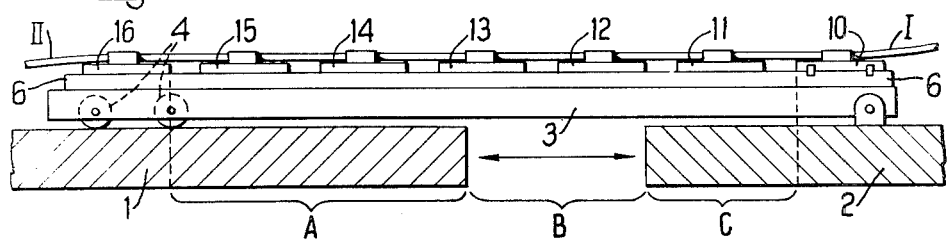
FIG. 1 shows the principle of the invention illustrated by means of a simplified representation of an expansion gap.

In FIG. 1 the end of the expanding/contracting bridge section 1, and the static bridge head 2 is separated by the expansion gap B. Across this expansion gap B, there is arranged a joint structure 3 which is pivotally hinged to the static bridge head 2 and which is slideably supported by the bridge structure 1, e.g. by means of roller bearings 4, which may be built into the joint structure 3, as shown in the figure, or possibly built into the bridge section 1. Other conventional slideable arrangements may of course also be used. Mounted on this joint structure there are arranged two parallel rails 6 on which seven wagons 10–16 are arranged. The first wagon 10 is fixed mounted to the rails, and the last wagon 16 may preferably be fixed mounted to the expanding/contracting bridge section. The remaining five wagons 11–15 are slideably mounted on the rails.

In the middle of each wagon is shown a cable fastening point. In the figures these cable fastening points are shown as top mounted cleats. The fastening points may however have many different designs. They may for instance be mounted on wagon-carried high, vertical poles, between which an excessive length of the cable may hang down. In the FIGS. 1 and 2 there are also used an excessive length of cable, but as the loops between the cleats are in a horizontal rather than in a vertical plane, this is not directly visible in these figures.

Each of the wagons 11–15 is, as already mentioned, slideably mounted on the rails 6, and now the principles after which these sliding movements are controlled, shall be explained in detail.

When the bridge section 1 expands (e.g. due to an increased environmental temperature or variations in the bridge load), the expansion gap B is varied accordingly. The principle of the invention used on this particular embodiment now is that the distance between each two adjacent wagons shall be forceably varied in step with the variations of the expansion gap itself.

Figure 2:
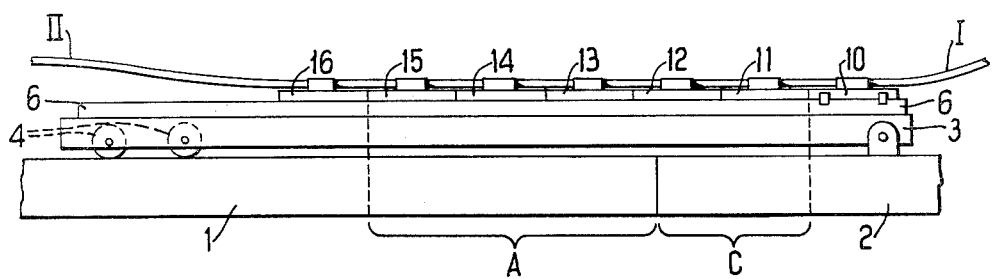
FIG. 2 shows the same expansion gap as in FIG. 1, but here in a contracted position.

Referring to FIG. 2, here is as an example shown the position with the expansion gap B reduced to zero. Then the smaller gaps between the wagons 10–16 are also reduced to zero. The result of these movements therefore is that each small section of the cable has been exposed to the same bending.

As it is also shown on the FIGS. 1 and 2, the uttermost wagons maintain a fixed position relative to their associated bridge elements. This is in the figures shown as the distance from the end of the respective bridge element to the uttermost associated wagon (on the figures designed as distances A respectively C), remains constant as the expansion gap B varies.

The control of the momentary wagon positions may be performed in many different ways, and using many different techniques. Some possibilities are shown in the FIGS. 3, 4, 5 and 6.

Figure 3:
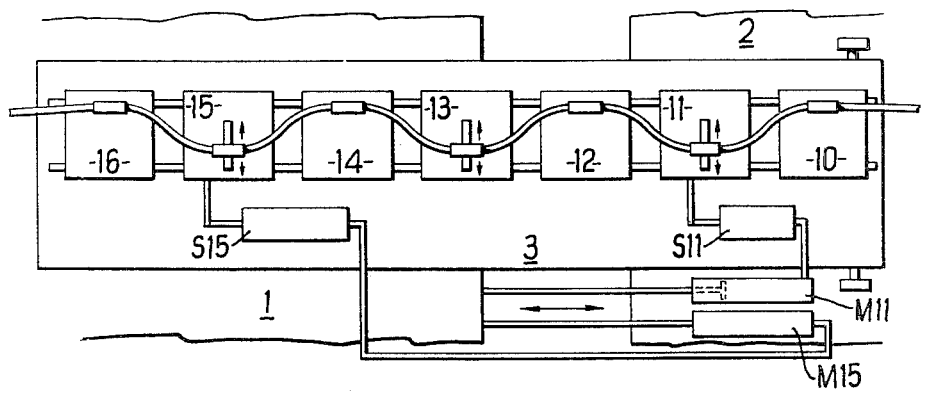
FIG. 3 shows a hydraulic or pneumatic embodiment of the controlling system according to this invention.

In FIG. 3 there is shown a hydraulic or pneumatic system. Each wagon (for the purpose of simplicity only shown for wagons 11 and 15 in the figure) is moved by a slave cylinder S11, S15 which is fixed to the joint structure 3 and acts on the respective wagon. Each slave cylinder is energized from an associated master cylinder M11, M15 arranged in the expansion gap. Since the relative longitudinal movement of each wagon with respect to the joint structure should not be the same for all the wagons, the cross-section of either the master or the slave cylinders have to be determined according to the actual requirements. In the shown embodiment the total expansion gap is subdivided into six subgaps D. Now assume that a change dB in the expansion gap B shall result in a change dDn in the nth subgap Dn. All movements are considered relative to the joint structure 3. Then the wagon 10 shall move a distance dD10=0/6.dB; and in a similar manner for the remaining wagons: dD11=1/6.dB; dD12=2/6.dB; dD13=3/6.dB; D14=4/6.dB; dD15=5/6.dB; dD16=6/6.dB.

According to this the cross section of the master cylinder M13 shall be 3/6 times the cross section of slave cylinder S13. There is, of course, no need for cylinders on the wagons 10 and 16, which may be clamped to the joint structure 3 and to the bridge section 1 respectively.

Figure 4:
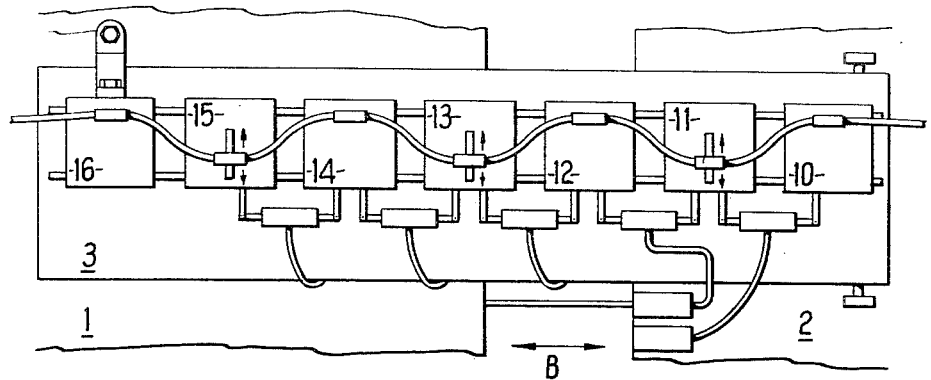
FIG. 4 shows a modification of the hydraulic or pneumatic control system of FIG. 3.

A different solution using master and slave cylinders having the same cross section, is shown in FIG. 4. This achievement is obtained by arranging the slave cylinders between each two adjacent wagons. Then the movement of each wagon with respect to the joint structure 3 will be the distance obtained when adding the movements of all the preceeding wagons to the movement of the wagon considered. Using the reference dWn for the relative movement between the wagon number n and the joint structure, and otherwise using the references above, this will give:
dW10=0/6.dB; dW11=dW10+1/6.dB; dW12=dW10+dW11+1/6.dB;
dW13=dW10+dW11+dW12+1/6dB; etc. The same relative movements as in FIG. 2 are then obtained using the same diameter for all master cylinders on one hand and all slave cylinders on another hand. The relation between the diameters of one master cylinder and its corresponding slave cylinder must obviously be determined from the number of sub-gaps involved.

In FIGS. 2, 3 and 4 there are an uneven number of wagons involved. This leads to a preferred embodiment wherein the cable path is represented by a sine wave starting and ending at the top of the wave (or at the bottom). With this arrangement the cable fastening points on every second wagon may be fixed to the wagon without undertaking neither rotational nor transversal movements. In the FIGS. 3 and 4 the fastening points on wagons 10, 12, 14 and 16 are thus fixed to the wagon. The cable fastening points on wagons 11, 13, and 15 must however be adjusted in transversal direction as the expansion gap changes. This adjustment may be undertaken forceably or may possibly be guided by the cable stiffness. When a controlled adjustment in transversal direction is desired, this can be obtained in a number of ways. One possibility is to arrange the cable fastening points in transversal recesses in their respective wagons, and let a downward protruding tap on each fastening point interact with a wedge shaped edge underneath the wagon and fastened to the joint structure 3. Then the position of the wagon on the joint structure shall directly determine the transversal position of the fastening point. A separate control system may, of course, also be used to ensure the transversal or rotational position in accordance with the momentary expansion gap. Such modifications may be undertaken making use of conventional techniques. This is therefore not shown in further detail on the drawings.

Figure 5:
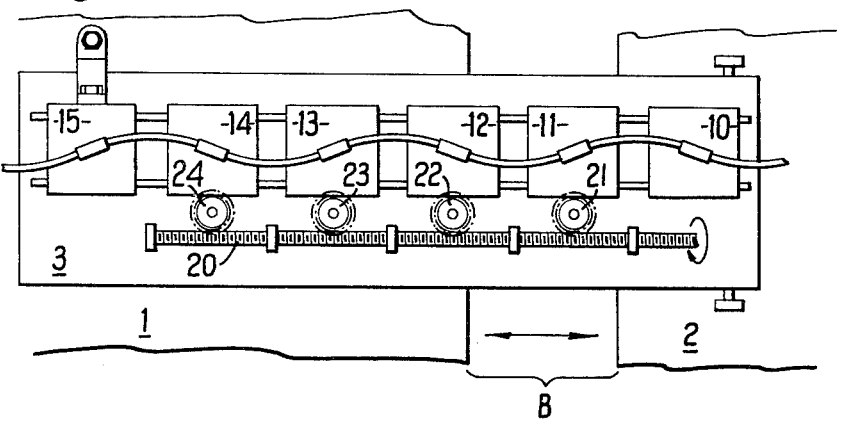
FIG. 5 shows an electro-mechanical embodiment of the control system.

In FIG. 5 still a further embodiment is shown. Here the moveable wagons are moved by a common, threaded shaft 20 acting or individual gears 21,22,23 and 24, one for each wagon. By choosing the pitch of the different parts of the shaft and/or by using properly selected gear ratios for each gear, the desired movement of each wagon may be obtained. The rotation of the shaft may also be controlled in many different manners. It may be operated hydraulic or pneumatic by a master cylinder (not shown) or it may be operated by an electric motor controlled by an expansion gap detector. A selsyne generator may for instance be used to detect the expansion gap width, and a selsyne follower may transfer this information to the shaft. Separate selsyne followers for each moveable wagon may of course be used as well. The rotating shaft/gear arrangement may also be modified in many different manners without leaving the main scope of this invention.

Figure 6:
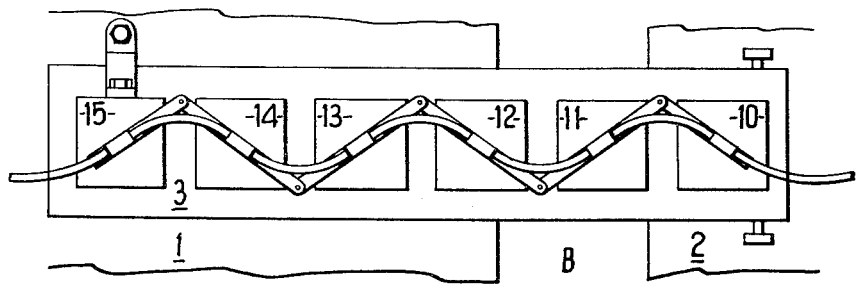
FIG. 6 shows a mechanical embodiment of the control system according to this invention.

In FIG. 6 a simple mechanical arrangement is shown. Here each wagon is controlled by a lever arm connected to lever arms on the adjacent wagons. The cable passes through cleats arranged on each lever member. By this simple arrangement there is not only obtained a longitudinal movement of the cleats according to the changes in the expansion gap, but a desired forceable rotation is obtained as well. By a proper design of the lever arm's length and arrangement, just the desired proportion between the longitudinal movements and the rotational ones may easily be obtained.

Many different arrangements and modifications may be done within the scope of the present invention.

Thus the uttermost wagon to the left may be omitted. As it moves in step with the bridge section 1 and may be clamped to this, it may of course also be replaced by a clamping device on the bridge itself.

As already mentioned, some of the wagon may be guided only by the elasticity and stiffness of the cable. The stiffer and more elastic the cable is, the longer may the distance between forceably controlled fastening points be.

The joint structure 3 may also have many different designs. Thus it can be divided so that one half is connected to each part of the bridge. With such an arrangement and when a hydraulic or pneumatic system is considered, the master cylinder may be divided too. That means that one half of each effective master cylinder should be connected to each bridge section. This is a practical arrangement to avoid movements in the pipe system leading the fluidum of the system. Combinations of the above described embodiments are also possible within the scope of this invention.

It is also, as shown in FIG. 7, possible to arrange more than one moveable fastening point on each wagon. And then the different fastening points may be moveable after different arrangements. Thus some of the points may be forceably moved transversally, other may be forceably moved longitudinally, and still others may be forceably controlled in a rotational manner. The cleats may also be controlled in more than one of said directions or modi. And as already mentioned, some of the cleats may move freely, only guided by the cable itself. Free movement in one direction, e.g. as to rotation, and forceable movement in other directions may also be combined.

In the figures not all such combinations are shown, but the most practical solution may be selected in each case. In the shown example on FIG. 7, the cleats 30 and 32 can both be rotated and be moved longitudinally, while the cleat 31 only can rotate. The control arrangement may be of the same kind for all the cleats, they may also be controlled by separate and even different systems. Thus some of the cleats may be controlled by an mechanical control system, while others are controlled by an electro-mechanical or hydraulic system. A practical solution may also be to control the cleats arranged on one common wagon by a common system, while the position of the individual wagons may be controlled by a quite different control system. As an example the cleats on the same wagon may be controlled by an mechanical system, while the movements of the wagons may be controlled by an hydraulic system.

So far only movements in one single plane have been considered. In many applications as e.g. power connections for marine platforms, as floating nuclear energy stations or the like, a more complex mutual movement may be required.

In the FIGS. 8 and 9 this is illustrated in a simple manner. The power station 40 is floating near a break-water 41 or another land connected structure. Between the break-water and the floating platform there is arranged a flexible, supporting structure 42. This structure 42, may be of a frame-work type, or any similar light-weight construction. This flexible structure must have a construction allowing all the required movements, and preferably also detecting the movements of the platform.

In the embodiment shown in FIGS. 8 and 9 the structure 42 is hinged both to the platform and to the break-water by means of the horizontal bearings 43 and 44 respectively. The structure is also telescopic as there are arranged conventional telescopic joints 45 near the middle of the structure. The cable is arranged within this structure in such a manner that the projection of the cable into the horizontal plane takes the form of at least one sine wave period.

In FIG. 8 the ocean level is such that the structure is horizontal. The structure will then function as earlier described for the bridge type version. The detector 46 shown as a master cylinder, detects length variations in the structure, and compensate for such variations by forceably controlling the position of the cleats arranged in the middle of the structure in the horizontal plane.

When tide causes changes in the ocean level, the platform will move accordingly. In FIG. 9 an ebb-tide situation is shown. Here the structure 42 will obtain a slope position. This will affect both the earlier mentioned structure length detector 46 and the level change detector 47. These detectors may either be master cylinders or detectors of any other conventional type. The cleats by which the cable is clamped, are displaceable in all space directions. This may be arranged as principally shown in FIG. 10. The shown cleat 50 may be moved in horizontal, vertical or lengthwise direction. A combined movement may of course also be obtained. In this shown embodiment the detector 46 initiates a lengthwise movement as well as a horizontal movement to adjust the cable path to all length variations, while the level detector 47 affects the vertical movements and possibly the lengthwise movements to adjust for level variations. As a matter of fact it is not necessary to adjust the lengthwise position of each cleat. It should be sufficient that the length detector affects the transversal horizontal movements of the individual cleats and the level detector 47 affects the vertical movements of each cleat. Then the lengthwise position of each cleat should quite simply be locked.

As shown in the figure the vertical adjustments of the cleats should be carried out in such a manner that the vertical projection of the cable forms a half wave sine wave in a horizontal coordinate system. This assures that the cable shall always leave both the platform and the break-water in a horizontal direction. Thus no bending will occur at the cable ends.

In this complex version including compensation for movements in more than one plane, all the statements as to modifications mentioned above, are applicable. Thus a hydraulical, pneumatical, electrical, mechanical, electro-mechanical or even optical control method may be involved. For this complex version it is also practical to let a small computer treat the detections of length and level variations and from these detections deduce the compensating movements to be carried out in each coordinate direction at each cleat.

Finally it should be stated that this invention concerns a general principle, and therefore are not limited to the embodiments shown. Thus will e.g. a system including a submarine cable where the fastening points are represented by floating buoys having a variable and controlable buoyancy (ref. U.S. Pat. application No. 704,017), be within the scope of this invention. Further it includes systems where the movements to be compensated for are due to temperature or load variations. The detectors should then be temperature or strain detectors respectively.

When the problem to obtain an evenly distributed bending of a cable leaving a platform and entering the seabed is considered, this may also be solved using a modification of this invention.

In this case one or a plurality of structures similar to the structure 42 in FIGS. 8 and 9 may be used. Such structures may not always be straight ones. They could preferably be curved, e.g. follow a circle line or a catenary line. Within such a structure the forceably controlled cleats may guide the cable to a correct position as the platform moves, due to current and wind.

Such a submerged structure or a combinations of such structures may be held in a correct position partly by the cable itself and partly by buoyancy devices, possibly having a variable and controlable buoyancy as described in U.S. Pat. appl. No. 704,017.

Preferably one such structure having a quarter-circle form may be used where the cable leaves the platform, and one other similar structure may be used where the cable enters the sea-bed.

To keep the structures in correct positions both anchoring devices, buoyancy devices and thrusters may be used in any suitable combinations.

Similar methods may also be used to distribute the movements in submerged cable lengths as the platform moves. This is especially required for large energy producing units as the planned OTEC (Ocean Thermal Energy Conversion) platforms.

A controlled distribution may be obtained by using short, curved bend limiting devices being kept in place by means of anchored buoyancy devices equipped with thrusters. The cable can then hang freely between such devices. These thrusters determine the sideways positioning of each bend-limiting device, while the anchors and the buoyancy devices determine the elevation of same.

Simplified examples of these applications are shown in FIGS. 11 and 12.

We claim:

1. Apparatus for installing an elongated member over two bodies with a changeable gap between the bodies, comprising a flexible structure connected to the bodies and movably engaged with at least one of the bodies, a plurality of fastening means movably mounted on the structure for securing the elongated member at a plurality of points along the structure, and adjusting means for evenly distributing the plurality of fastening means and bending the elongated member between adjacent fastening means in response to changes in the gap, wherein at least one of the fastening means is moved hydraulically, and including means arranged in the variable gap for controlling fastening means movement.

2. Apparatus according to claim 1, including a slave cylinder engaged with the fastening means.

3. Apparatus according to claim 2, including slave cylinders arranged between adjacent fastening means, the cross sections of all the slave cylinders being equal.

* * * * *

UNITED STATES PATENT AND TRADEMARK OFFICE
CERTIFICATE OF CORRECTION

PATENT NO. : 4,257,717
DATED : March 24, 1981
INVENTOR(S) : Sigmund Ege

It is certified that error appears in the above—identified patent and that said Letters Patent is hereby corrected as shown below:

On the Front Page between "[22] Filed: Oct. 3, 1977"

and "[51] Int. Cl.$^2$ .........F16L 3/00" insert

--[30] Foreign Application Priority Data

Oct. 4, 1976 [NO] Norway ..... 763380--.

Signed and Sealed this

*First* Day of *September 1981*

[SEAL]

*Attest:*

GERALD J. MOSSINGHOFF

*Attesting Officer*     *Commissioner of Patents and Trademarks*